United States Patent
Sivanesan et al.

(10) Patent No.: US 12,451,910 B2
(45) Date of Patent: Oct. 21, 2025

(54) ROADSIDE UNIT, A PROCESSING MODULE FOR PROCESSING A ROADSIDE UNIT SIGNAL, AND A METHOD OF PROCESSING A ROADSIDE UNIT SIGNAL

(71) Applicant: Intel Corporation, Santa Clara, CA (US)

(72) Inventors: Kathiravetpillai Sivanesan, Portland, OR (US); Leonardo Gomes Baltar, Munich (DE); Arvind Merwaday, Hillsboro, OR (US); Suman A. Sehra, Folsom, CA (US); Andradige Silva, Portland, OR (US); Soo Jin Tan, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 414 days.

(21) Appl. No.: 18/058,280

(22) Filed: Nov. 23, 2022

(65) Prior Publication Data

US 2023/0208454 A1    Jun. 29, 2023

(30) Foreign Application Priority Data

Dec. 24, 2021  (WO) ................ PCT/CN2021/141156
Apr. 27, 2022  (EP) ................... 22 170 249

(51) Int. Cl.
*H04W 4/44*     (2018.01)
*H04B 1/04*     (2006.01)
*G08G 1/01*     (2006.01)

(52) U.S. Cl.
CPC ............. *H04B 1/04* (2013.01); *G08G 1/0116* (2013.01)

(58) Field of Classification Search
CPC ...... H04B 1/04; H04B 1/0007; G08G 1/0116; G06F 21/53; H04W 4/44
See application file for complete search history.

(56) References Cited

U.S. PATENT DOCUMENTS 11,924,722 B2 *  3/2024  Chen ...................... H04W 80/08
12,081,652 B2 *  9/2024  Lee ........................ H04W 12/00
(Continued)

FOREIGN PATENT DOCUMENTS

WO    WO-2021003059 A1 *  1/2021  ............ H04W 16/14

OTHER PUBLICATIONS

European Search Report issued for the corresponding patent application No. EP 22 17 0249.1, dated Oct. 21, 2022, 9 pages (only for informational purposes).

(Continued)

*Primary Examiner* — Kenneth T Lam
(74) *Attorney, Agent, or Firm* — Viering, Jentschura & Partner mbB

(57) ABSTRACT

Disclosed herein is a roadside unit with a radio frontend port configured to receive a first signal representing a radiofrequency transmission according to a first radio communication protocol, to receive a second signal representing a radiofrequency transmission according to a second radio communication protocol. A first processing subsystem configured to execute a first baseband process of the first radio communication protocol on the first signal and to generate a first output signal as an output of the first baseband process. A second processing subsystem configured to execute a baseband process of the second radio communication protocol on the second signal and to generate a second output signal as an output of the second baseband process. The first processing subsystem is a first software containerization or a first machine virtualization of the processor, wherein the second processing subsystem is a second software containerization or a second machine virtualization of the processor.

20 Claims, 6 Drawing Sheets

(56) References Cited

U.S. PATENT DOCUMENTS

| | | | |
|---|---|---|---|
| 2010/0182986 A1* | 7/2010 | Okuike | H04W 56/00 |
| | | | 370/338 |
| 2019/0138934 A1* | 5/2019 | Prakash | H04L 43/16 |
| 2020/0274219 A1* | 8/2020 | Pehlke | H03F 3/195 |
| 2020/0365012 A1* | 11/2020 | Zagajac | G08G 1/096783 |
| 2021/0014656 A1* | 1/2021 | Mueck | H04W 4/40 |
| 2021/0235240 A1* | 7/2021 | Bandi | H04W 4/40 |
| 2021/0306277 A1* | 9/2021 | Yamashiro | H04W 4/40 |
| 2021/0385865 A1* | 12/2021 | Mueck | H04W 80/02 |
| 2023/0199445 A1* | 6/2023 | Kim | H04W 4/40 |
| | | | 370/329 |

OTHER PUBLICATIONS

Abi Research, "V2I to drive ITS Roadside Infrastructure Market Despite Regulatory Uncertainty", restrived from https://www.abiresearch.com/press/v2i-drive-its-roadside-infrastructure-market-despiteregulatory-uncertainty/ on Jun. 19, 2025, 1 page.

D. Wubben et al., "Benefits and Impact of Cloud Computing on 5G Signal Processing: Flexible centralization through cloud-RAN," in IEEE Signal Processing Magazine, vol. 31, No. 6, pp. 35-44, Nov. 2014, doi: 10.1109/MSP.2014.2334952.

G. Otero Pérez, D. Larrabeiti López and J. A. Hernández, "5G New Radio Fronthaul Network Design for eCPRI-IEEE 802.1CM and Extreme Latency Percentiles," in IEEE Access, vol. 7, pp. 82218-82230, 2019, doi: 10.1109/ACCESS.2019.2923020.

\* cited by examiner

ROADSIDE UNIT, A PROCESSING MODULE FOR PROCESSING A ROADSIDE UNIT SIGNAL, AND A METHOD OF PROCESSING A ROADSIDE UNIT SIGNAL

CROSS-REFERENCE TO RELATED APPLICATION(S)

This application claims priority to Application No. PCT/CN2021/141156, which was filed on Dec. 24, 2021, and to European Patent Application No. 22 170 249.1, which was filed on Apr. 27, 2022, the entirety of both of which are incorporated herein by reference.

TECHNICAL FIELD

Various aspects of this disclosure generally relate to software-implemented baseband processing for wireless communication.

BACKGROUND

Roadside units (RSU) wirelessly communicate with vehicle on-board units (OBU) and may function as an interface between OBUs and traffic sensors (e.g. cameras, Light Detection and Ranging (LIDAR), etc.) and/or other traffic control infrastructures. RSUs and OBUs may include wireless communication capabilities, such as via vehicle-to-anything (V2X) or infrastructure-to-anything (I2X) systems. RSU V2X modules may be configured to operate in the 5.9 GHz band. RSUs may send and/or receive wireless communications according to the $3^{rd}$ Generation Partnership Project's (3GPP) cellular vehicle-to-everything (C-V2X) protocol, the Institute of Electrical and Electronics Engineers (IEEE)-based Dedicated Short-Range Communications (DSRC) protocol, the Intelligent Transport Systems (ITS)-G5 protocol, or any of these. Any, or any combination, of these protocols may share channels for RSU communication. RSUs are thus conventionally configured with multiple hardware modems for baseband signal processing, such as, for example, a hardware modem for DSRC communication and a hardware modem for ITS-G5.

Multiple hardware modems add cost to an RSU. Moreover, as standards change and/or technologies become undesirable or obsolete, hardware-driven baseband processing may limit the ability to perform upgrades, as such upgrades may require replacement of hardware equipment.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary embodiments of the disclosure are described with reference to the following drawings, in which.

DESCRIPTION

Figure 1:
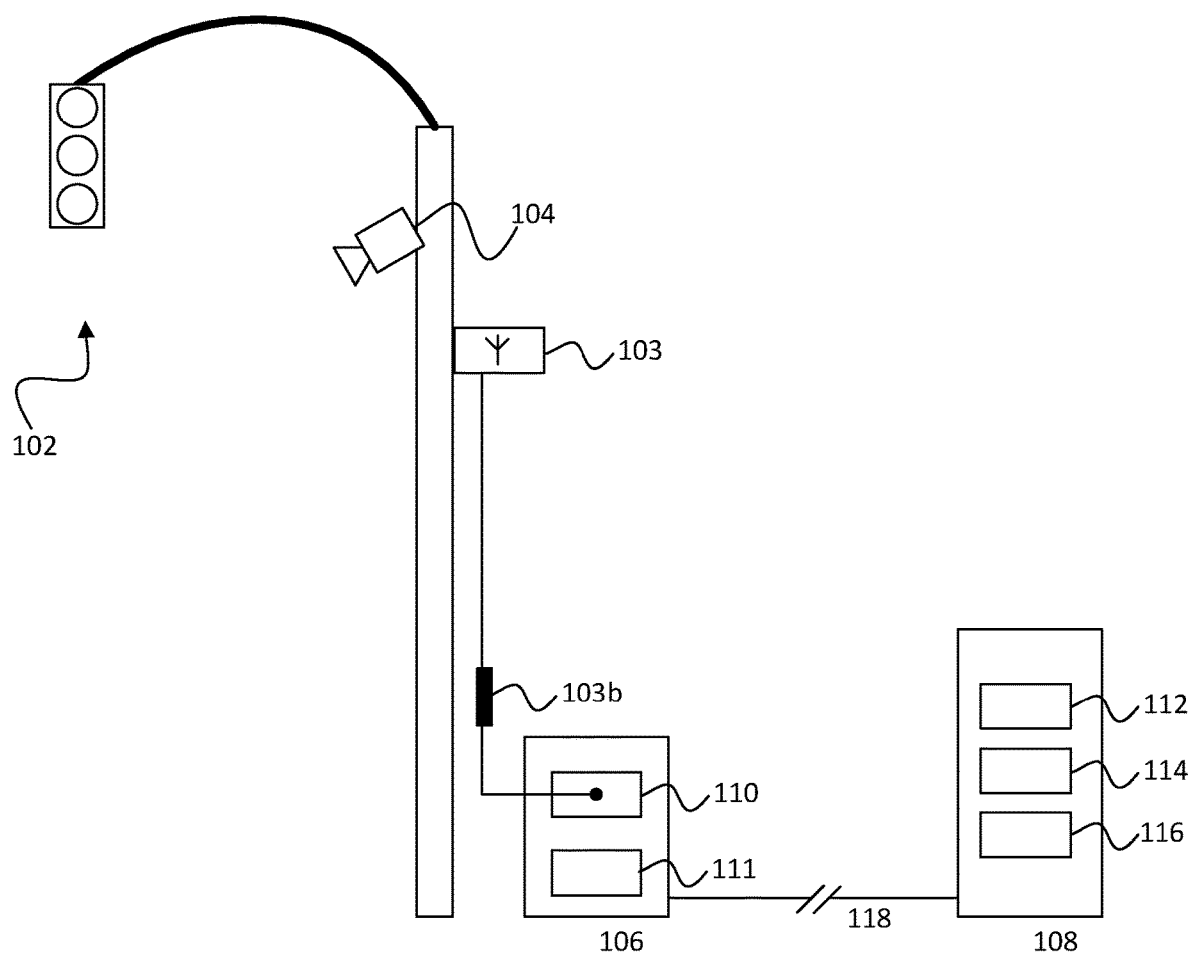
FIG. 1 depicts an RSU installation, according to an aspect of the disclosure.

The following detailed description refers to the accompanying drawings that show, by way of illustration, exemplary details and embodiments in which aspects of the present disclosure may be practiced.

The word "exemplary" is used herein to mean "serving as an example, instance, or illustration". Any embodiment or design described herein as "exemplary" is not necessarily to be construed as preferred or advantageous over other embodiments or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as radiofrequency (RF) transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

V2X generally describes communication that occurs between a vehicle and any other device or thing. As V2X technology has developed, many different implementations of V2X have been disclosed. Generally speaking, these may be understood as cellular-based V2X or Wi-Fi based V2X. An example of a Wi-Fi based V2X technology is DSRC, which may operate by permitting the creation of ad-hoc Wi-Fi networks between vehicles and other devices (e.g. infrastructure elements or RSUs). An example of a cellular-based V2X technology is the C-V2X (cellular V2X), which permits device-to-device (e.g. sidelink) communications and/or device-to-network communications. A further example of a cellular-based V2X technology is the ITS-G5 technology. In some instances, the C-V2X technology may be prevalent in the United States, whereas the ITS-G5 technology may be prevalent in Europe. It may be desirable to create an RSU that can operate according to either or both of C-V2X and/or ITS-G5. For any such RSU, it may be desirable that the RSU also be able to operate according to DSRC.

Conventional modems used in an RSU or OBU may be generally understood as including a RF frontend and a hardware-based baseband processing module. Conventionally, the baseband processing modular performs much of the baseband processing in hardware. Hardware implementation of baseband functions may be conventionally preferred in many radiofrequency communications devices because hardware-based baseband processing is often associated with decreased latency compared to software-based processing. V2X standards, however, are associated with generous latency budgets, compared to many other wireless communication protocols, which renders software-based processing an option. That is, as the initial C-V2X and DSRC/ITS-G5 protocols are multicast or broadcast protocols, they lack strict timing requirements in the physical (PHY) layer functions. This may be contrasted, for example, with the Fourth Generation (4G) Long Term Evolution (LTE) Unicast transmission requirement with Hybrid Automatic Repeat Request (HARQ), which has a stringent timing requirement in which the acknowledgment of the received packet must be transmitted in 3 ms. Next generation radio access technologies such as the 3GPP $5^{th}$ Generation Technology Standard (5G) and the developing $6^{th}$ Generation Technology Standard (6G) include latency requirements that are at least as stringent. The relaxed timing requirement associated with the C-V2X and DSRC/ITS-G5 protocols, however, and the possibility of sharing components between different access technologies make the C-V2X and DSRC modems suitable for software implementation. Instead of a hardware-based model, the baseband processing of the V2X modem may be implemented in software (e.g. virtualized on general-purpose processing modules and accelerators). Such software implementation may improve manageability, increase flexibility for upgrades, and simplify or accelerate deployment.

Moreover, software-based baseband processing can be configured to process signals according to a plurality of radio communication protocols, such as DSRC, ITS-G5, C-V2X, or any combination of these. Thus, one or more processors can be configured not only to perform most of the functions of the baseband modem, but also to essentially replace the multiple baseband modems that are conventionally employed in an RSU.

Implementing the baseband processing in software (e.g. such as by virtualizing the baseband processing on a local processing module) may render the RSU or OBU less expensive, more flexible for upgrades, and may generally improve deployment by reducing the time-to-market, which tends to be longer for hardware than for software.

Further utilizing the ability to implement software-based baseband processing in a V2X environment, a software-based V2X baseband-processor may be configured to operate in a multi-mode environment, such as by processing signals according to DSRC and at least one of C-V2X or ITS-G5. Some RAN functions can also be shared between those technologies, which renders them more flexible for load balancing and admission control.

Whatever the specific protocol used, jurisdictions around the world have allocated the 5.9 GHz spectrum for V2X communications. This spectrum may include multiple 10 MHz and 20 MHz channels. Some of these channels may be dedicated to the 3GPP based C-V2X; while another set may be allocated for the IEEE 802.11p based DSRC (US) or ITS-G5 (Europe). Some may require both technologies (e.g. both a cellular-based technology and a Wi-Fi based technology) to coexist in adjacent or even in the same channel. RSUs, vehicles OBUs, and other traffic participants, may need to support both technologies (e.g. DSRC and either C-V2X or ITS-G5) depending on local regulations.

A software-defined RSU may include an RF frontend, which may include an antenna port and an analog/digital (or digital/analog for transmissions) converter. The RF frontend may optionally further comprise an antenna, connected to the antenna port. The antenna may optionally be disposed separately from the RF frontend, and then electrically conductively connected to the RF frontend, such as via a cable. Because the received signals on the antenna are unamplified and/or because signals traveling along the cable to the RF frontend are subject to attenuation, the electrical conductive connection may include a cable compensator that is configured to compensate for the signal attenuation. As a general matter, the components of the RF frontend are agnostic to the particular wireless protocol used and may thus be reused across different radio access technologies, such as DSRC, C-V2X, or ITS-G5. The RF frontend is connected to an RSU that includes one or more processors, configured to implement the baseband processes (Layer 1) and the functions of the higher layers (layers two and above) are typically implemented in the one or more processors. These one or more processors may be general-purpose processors; however, for computationally heavy processes (e.g., channel decoding), additional accelerators (FPGA, vector processors, etc.) could be employed. Another benefit is that computing resources may be pooled, and the on-demand resource provisioning may be performed to meet the performance requirements.

FIG. 1 depicts an RSU installation, according to an aspect of the disclosure. An RSU 108 may be located in a vicinity of a traffic control infrastructure 102. The RSU 108 may be configured to receive sensor data from one or more sensors 104 (e.g. one or more image sensors, one or more LIDAR units, etc.). The RSU 108 may be configured to communicate with the traffic control infrastructure 102.

In an exemplary situation as depicted in FIG. 1, the RSU 108 and a RF frontend 106 operate together to perform V2X baseband signal processing. The RF frontend 106 may include an antenna port 110 and a digital/analog converter (and/or an analog/digital converter for transmission) 106. The antenna port 110 may be electrically conductively connected to one or more antennas, which may be located in or on the FR frontend 106, or, as depicted in FIG. 1, in a vicinity of the RF frontend 110, such as optionally being connected to a traffic infrastructure. As stated above, the RF frontend's antenna port 110 may be connected to the one or more antennas 103 via a cable. The cable may include a cable compensator 103b, which may be configured to compensate for signal attenuation between the one or more antennas 103 and the RF frontend 110.

Also the RF frontend is described above as being distinct from the RSU, the RF frontend and the RSU may be combined into an RSU system. In this manner, the RSU system comprises both the RSU as described herein, and the RF frontend. The RSU system may optionally additionally comprise the data link between the RF frontend and the RSU, one or more antennas connected to the RF frontend, a cable between the one or more antennas and the RF frontend, a cable compensator to compensate for signal attenuation between the one or more antennas and the RF frontend, or any of these.

The RSU 108 may include a radio frontend port 112, configured to receive a first signal (e.g. a first digital signal) representing a radiofrequency transmission received at a radio frontend according to a first radio communication protocol; and receive a second signal (e.g. a second digital signal) representing a radiofrequency transmission received at the radio frontend according to a second radio communication protocol, different from the first radio communication protocol; a processor 114, comprising a first processing subsystem, configured to execute a first baseband process of the first radio communication protocol on the first signal and to generate a first output signal as an output of the first baseband process; a second processing subsystem, configured to execute a baseband process of the second radio communication protocol on the second signal and to generate a second output signal as an output of the second baseband process; wherein the first processing subsystem is a first software containerization or a first machine virtualization of the processor, and wherein the second processing subsystem is a second software containerization or a second machine virtualization of the processor. The RSU may further comprise an output port 116, configured to output the first output signal and the second output signal to a processing unit. The processing unit may be any unit that receives and processes in any way an output of the RSU. The processing unit may be or include a controller for the RSU, a cloud server, a data aggregator, or otherwise.

In the software-defined RSU, the RF frontend 106 must be connected with the RSU 108. This may be achieved, for example, with a high capacity (at least ~1 Gb/s) link 118 and/or by using an enhanced common public radio interface (eCPRI) interface using optical fiber links or Giga bit Ethernet. The RF frontend 106 may optionally be mounted on a pole or the streetlight post or an existing street furniture.

According to one aspect, it may be beneficial in certain circumstances to use eCPRI for the link between the RF frontend 106 and the RSU 108, as the eCPRI allows the RF frontend 106 and the RSU 108 to be placed quite far away from one another, which may be desirable in certain circumstances. In some implementations, these may be placed as far as ~10 km away from one another using eCPRI. The RSU 108 may be placed in a signal box or dedicated box with required power, network connections, and cooling. According to an aspect of the disclosure, the RSU 108 may operate using a conventional x86 processing architecture. The RSU may be integrated within a standalone box for the RSU and any artificial intelligence (AI) (AI is commonly used in conjunction with RSUs, such as for sensory and media analytics).

According to an aspect of the disclosure, the first baseband process may comprise subcarrier demapping, an inverse discrete Fourier transform, decoding, demodulation, or any of these, in accordance with the first radio communication protocol. Similarly, the second baseband process may comprise subcarrier demapping, an inverse discrete Fourier transform, decoding, demodulation, or any of these, in accordance with the second radio communication protocol.

The first processing subsystem and the second processing subsystem may be implemented via one or more software containerization methods. In this manner, the first processing subsystem may be a first software containerization, and the second processing subsystem may be a second software containerization. Software containerization is a concept in which a standard unit of software that includes the relevant code and all of its dependencies is generated, such that this standard unit of code can be quickly run among a plurality of computer environments. Software containers are generally understood to be standalone packages of executable code. One advantage of using containerization may be that containers are isolated from their environment and therefore may allow for uniformity in operation despite variations in the platform on which they operate. The RSU processor may be configured to implement a software containerization using any known containerization method or protocol.

Software containers may operate as a standalone product or may include one or more subcontainers, which may each be configured to perform one or more discrete functions in service of the overarching function of the container in which the subcontainers reside. For example, in a baseband signal processing container (such as the first software containerization), the container may include a first plurality of software subcontainers, and each of the plurality of software subcontainers may be dedicated to any task, such as, for example, subcarrier demapping, an inverse discrete Fourier transform, decoding, demodulation, or any of these, for a given radio communication protocol.

Similarly, the second software containerization may include a second plurality of software subcontainers, which may be dedicated to any task, such as, for example, any of subcarrier demapping, an inverse discrete Fourier transform, decoding, demodulation, or any of these, for a given radio communication protocol.

Alternatively, rather than relying on containerization, the device may employ machine virtualization. Machine virtualization is a technique in which one or more virtual machines are implemented on a processing core. The use of virtual machines may include an additional security benefit as compared to the use of containers, given that virtual machines are isolated from one another and utilize their own distinct and isolated resources. That is, a first virtual machine may be unable to read or modify data resources of a second virtual machine, and vice versa. In this manner, the first processing subsystem may be a first machine virtualization, and the second processing subsystem may be a second machine virtualization.

Should the device implement one or more virtual machines, each virtual machine may, if desired, implement one or more software containers. In this manner, the first machine virtualization may implement a first plurality of software containers. Moreover, each of the plurality of software containers may be dedicated to any of subcarrier demapping, an inverse discrete Fourier transform, decoding, demodulation, or any of these. Similarly, the device may include a second plurality of software containers within a second machine virtualization, and each of the second plurality of software sub-containers may be dedicated to any of subcarrier demapping, an inverse discrete Fourier transform, decoding, demodulation, or any of these.

To manage these containers, the device may include a container orchestrator, which may be configured to orchestrate the actions of any of the first plurality of software containers or the second plurality of software containers, and/or any of their subcontainers. Container orchestration is known, and therefore a recitation of container orchestration will not be included herein.

Figure 2:
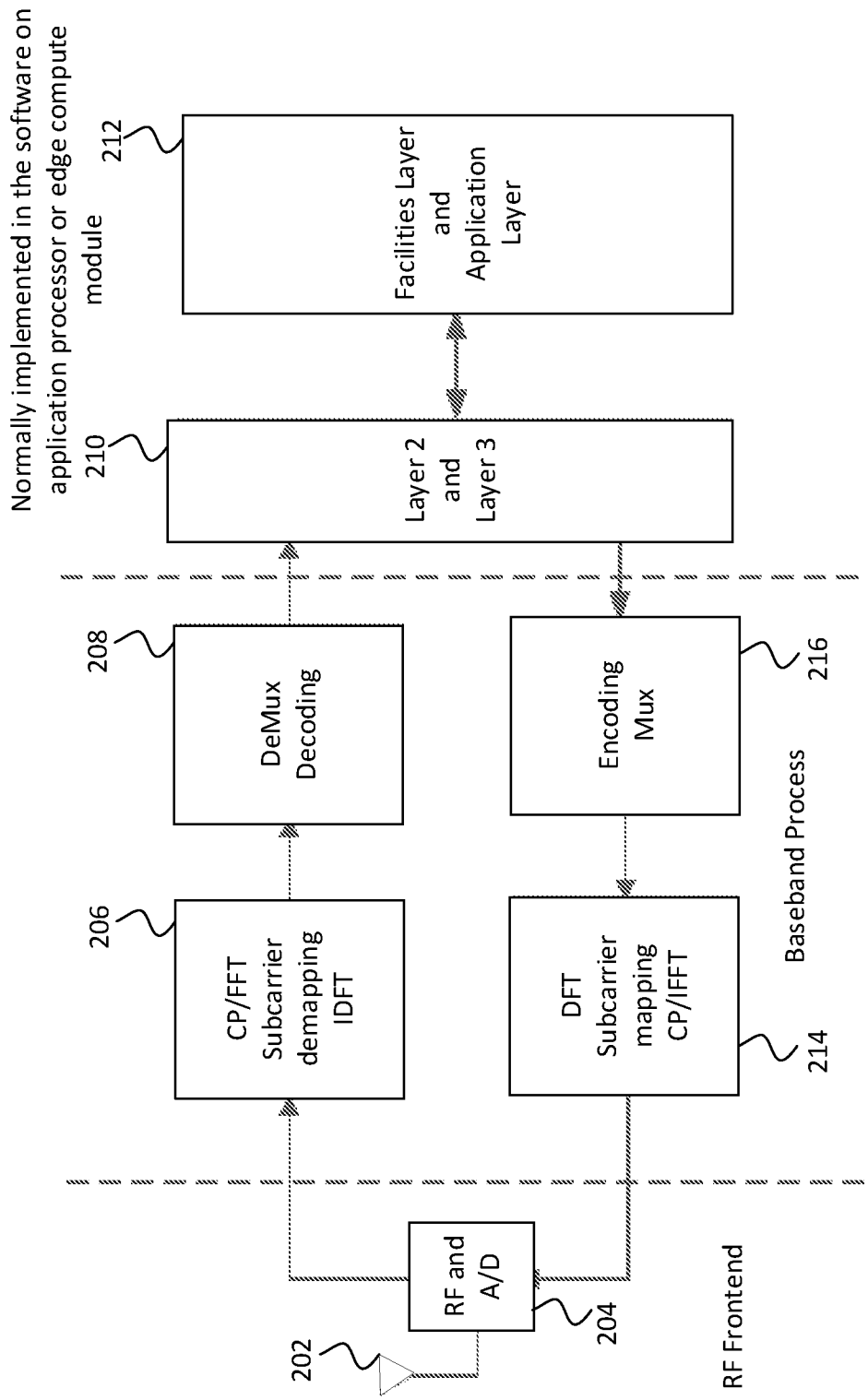
FIG. 2 depicts a functional block diagram of software-based C-V2X baseband processing in an RSU, according to an aspect of the disclosure.

FIG. 2 depicts a functional block diagram of a V2X modem, according to an aspect of this disclosure. In FIG. 2, one or more antennas 202 are connected to the RF Frontend, which includes an analog/digital (A/D) and/or digital/analog (D/A) converter 204. Once the analog RF signal is converted to a digital signal at the A/D converter, the FR frontend outputs the digital signal to the RSU, which is depicted herein in terms of functional blocks. Any of the following functional blocks may be carried out together on a common processor or core. Within the RSU, the cyclic prefix (CP) and Fast Fourier Transform (FFT) subcarrier demapping and Inverse Discrete Fourier Transform (IFFT) unit 206 transforms and demaps the signal and then outputs this transformed and demapped signal to the demodulation (DeMux) and decoding unit 208. The DeMux and decoding unit 208 outputs to Layer 2 and Layer 3 processing unit 210, which can transfer to and receive data from the Facilities Layer and Application Layer 212. The references to Layer 2 and Layer 3 refer to the Open Systems Interconnection (OCI) model, which is a commonly understood paradigm for signal processing. Although not explicitly stated elsewhere, the RF frontend and the RSU functional units may be configured to perform Layer 1 functions.

For transmissions, the Layer 2 and Layer 3 processing unit 210 outputs to the encoding multiplexer (Encoding Mux) 216, which outputs the encoded signal to the Discrete Fourier Transform (DFT), Subcarrier Mapping, and CP/Inverse Fast Fourier Transform (IFFT) functional unit 214, which in turn outputs to the RF frontend 204 for transmission over the one or more antennas 202. Functionally speaking, the RF frontend may include the one or more antennas 202 and the A/D 204; the baseband process may include the CP/FFT, subcarrier demapping and IDFT 206 and the DeMux and Decoding 208 on the receive side, and the encoding and multiplexing unit 216 and the DFT, subcarrier mapping, and CP/IFFT unit 214 on the transmit side. The upper layer processes include the layer 2 and layer 3 processors 210, and the facilities layer and application layer 212.

The one or more antennas 202 may be, for example, one or more shark-fin antennas or one or more omnidirectional antennas or surface mounted antennas. These antennas may be mounted, for example, on the body of radiofrequency frontend 204 and connected to the radiofrequency fronted 204, such as with a cable. Because of the loss associated with the use of a cable in this context, a cable compensator may be used between antenna and the RF frontend, for example, depending on the length of the cable. The RF frontend may be connected with the processing module, such as, for example, a general-purpose CPU, as well as to a memory, storage, accelerators, etc.

Figure 3:
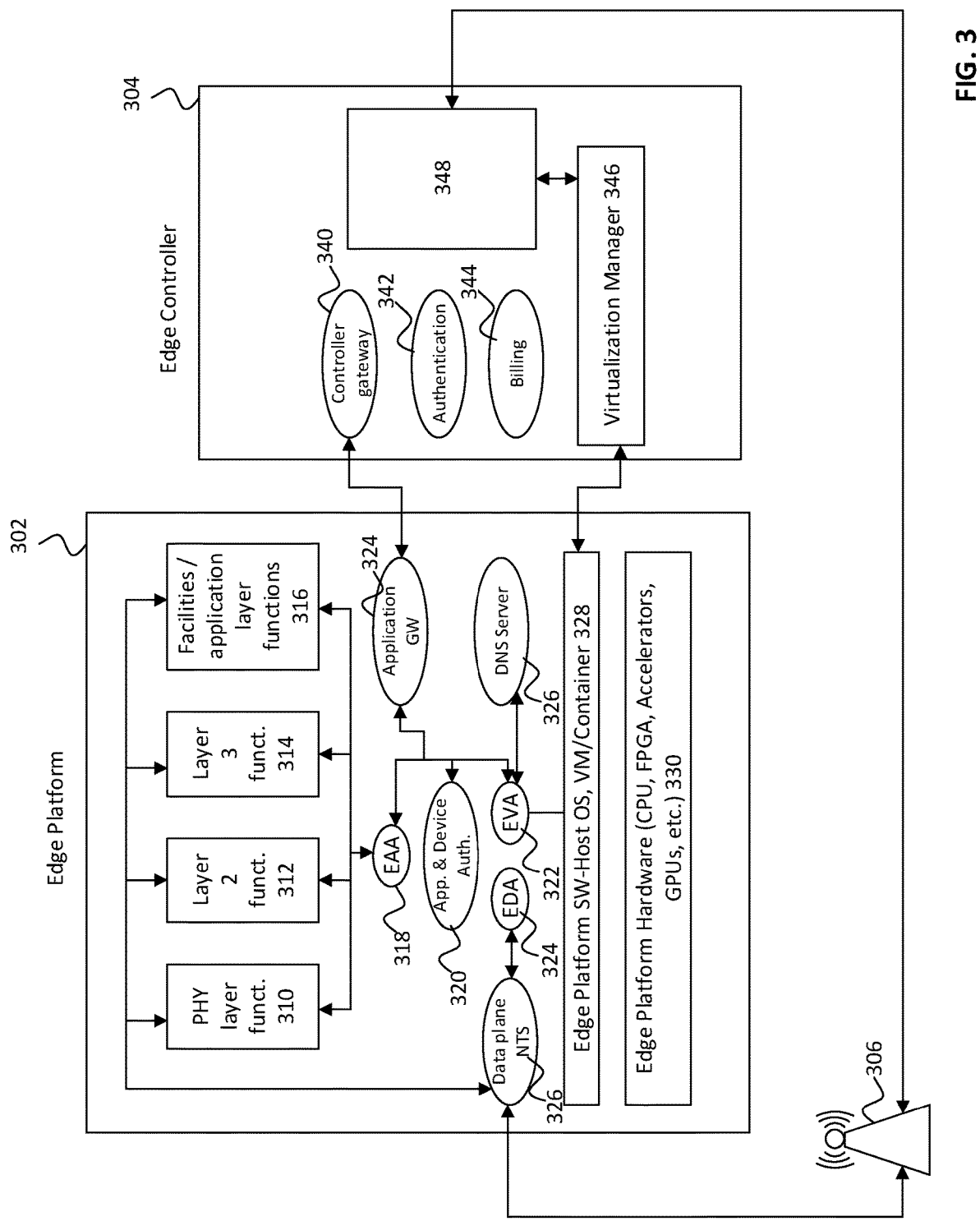
FIG. 3 depicts an implementation of software-based C-V2X baseband processing in an RSU.

FIG. 3 depicts an implementation of a C-V2C baseband function on an edge computing platform 302. The edge platform 302 may be communicatively connected to an edge controller 304. Both the edge platform 302 and the edge controller 304 may be communicatively coupled to a radiofrequency frontend 306. The edge platform 302 may include one or more edge application containers, such as, for example, a physical layer function container 310, a layer 2 function container 312, a layer 3 function container 314, a facilities/application layer function container 316, or otherwise. The EAA 318 may be configured to send information to, or received information from, any of the one or more edge application containers. The edge platform 302 may further comprise an application and device authorization module 320, an EVA 322, an EDA 324, a data plane NTS 326, and application gateway (GW) 324, a DNS server 326, and edge platform software host operating system virtual machine/container 328, and edge platform hardware 330 such as one or more CPUs, one or more field programming gate arrays (FPGAs), one or more accelerators, one or more graphics processing units (GPUs), etc. The edge controller 304 may include a controller gateway 340, and authentication unit 342, a billing unit 344, a virtualization manager 346, and a microservices unit 348, which may include a graphical user interface, and EVA controller, a network configuration agent, an authentication unit, a policy database, or any of these.

In certain circumstances, the IQ samples in the RF frontend link from the A/D converter may require a large capacity link, in the order of Gb/s. When general purpose hardware performs certain functions, for example FFT or IFFT, the RF frontend link's data rate may be significantly reduced. To that end, dual technology (C-V2X and DSRC) operation is enabled to mitigate the congestion in the ITS bands and load balancing by integrating the two technologies in layer 2. In the conventional architecture, the integration is possible above layer 3. The virtualization of baseband functions enables integration in the lower layers. In greater detail, the V2X may operate, for example, in the 5.9 GHZ ITS band. Different technologies (e.g., LTE C-V2X, DSRC, etc.) may also operate in this band. The different technologies may include multiple serial and/or parallel processes or computations in the lower layers, such as, for example, IFFT/FFT, modulation, demodulation, channel encoding and decoding, matrix multiplication, inversion, averaging, filtering, ordering, etc. By implementing the V2X modem in software, these above functions can be reused by different technologies. These functions may exist, for example, as a function call with different sets of attributes passed when orchestrating different technologies. Such a function call scenario may help to optimize the implementation.

Figure 4:
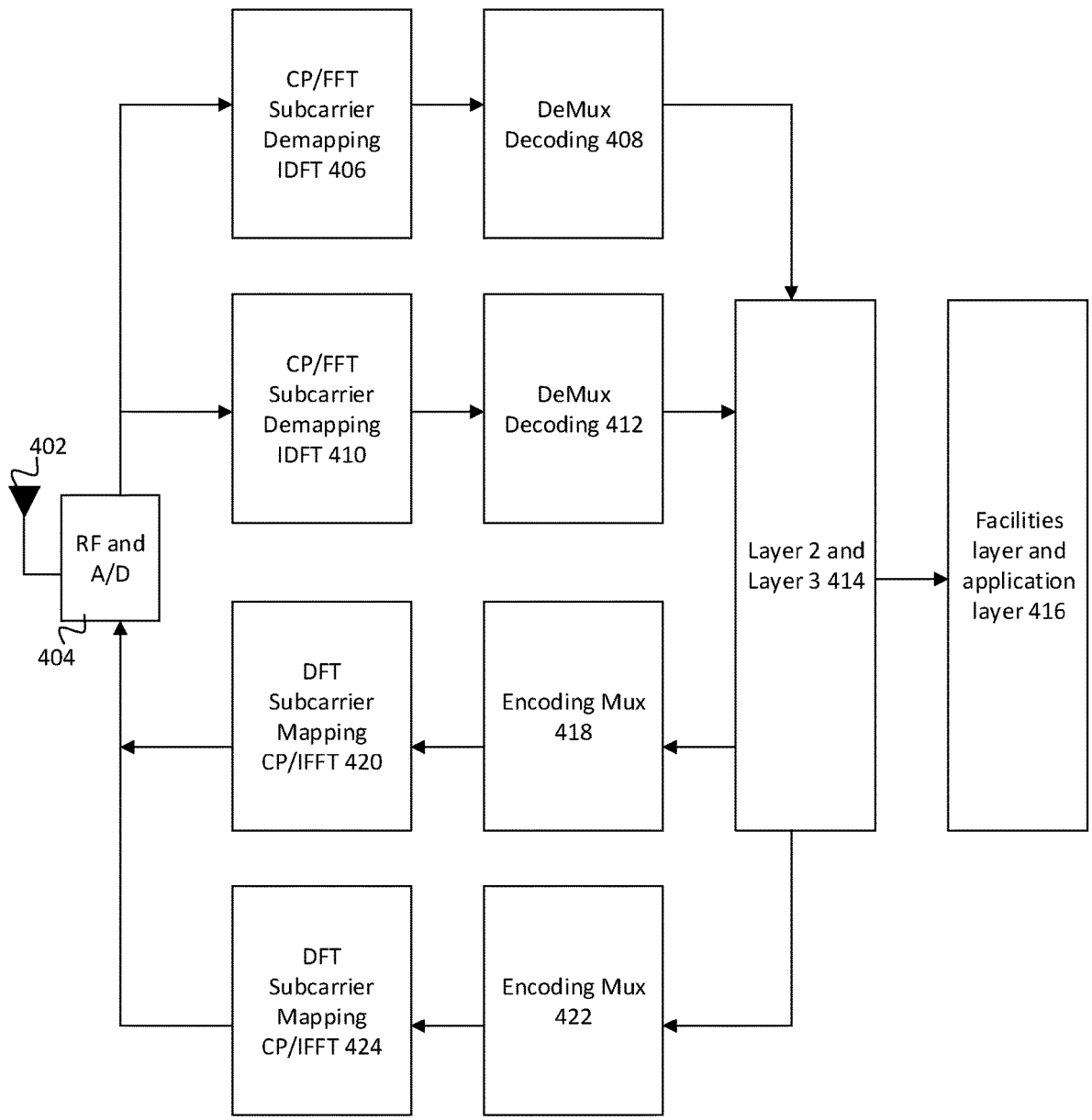
FIG. 4 depicts a functional block diagram of a dual-mode software-based RSU with layer 2 aggregation.

FIG. 4 depicts a functional block diagram of a dual-mode software-based RSU with layer 2 aggregation. According to one aspect of the disclosure, blocks 406, 408, 424, and 422 perform one or more baseband processes of a DSRC signal, whereas blocks 410, 412, 420, and 418 perform one or more baseband processes of a V2X/C-V2X signal. In greater detail, and with respect to the receive (Rx) signals for either DSRC or V2X/C-V2X, one or more antennas 402 are connected to the radiofrequency frontend and analog/digital (or digital/analog) converter 404. The output of the analog/digital converter 404 is connected to a cyclic prefix/Fast Fourier Transform, subcarrier demapping, and Inverse Discrete Fourier transform unit 406. The output of this unit is connected to a demultiplexer and decoding unit 408. The output of this unit is connected to the layer 2 and layer 3 processors 414, which also output to the facilities layer and application layer 416. Similarly, the output of the radiofrequency and analog/digital converter 404 is connected to the cyclic prefix and Fast Fourier Transform, subcarrier demapping, and inverse discrete Fourier transform unit 410, which outputs to the demodulation and decoding unit 412, which outputs to the layer 2 and layer 3 processors 414.

With respect to the Transmission (Tx) signals, the layer 2 and layer 3 processors 414 may output V2X/C-V2X signals to the encoding multiplexer 418, which may output to the discrete Fourier transform, subcarrier mapping, and cyclic prefix/inverse Fast Fourier Transform unit 420, which may output to the digital analog converter 404. With respect to the DSRC signals, the layer 2 and layer 3 processors 414 output to the encoding multiplexer 422, which outputs to the discrete Fourier transform, subcarrier mapping, cyclic prefix/inverse Fast Fourier Transform unit 424, which outputs to the digital/analog converter 404. It is expressly noted herein that the elements in this figure are depicted as functional blocks, and any number of functional blocks may be combined with any other number of functional blocks within any group of one or more processors.

In this manner, the unit may implement and run the DSRC and C-V2X baseband functions separately. These two radio access technologies may, however, utilize a common layer 2 and layer 3 functional block, which may include the DSRC and C-V2X frontend layer 2 functions and a common scheduler. The common scheduler may be configured to schedule the packets based on one or more load balancing procedures, such as with the goal of reducing network congestion. In this configuration, layer 3, the facilities layers, and the application layers are common between DSRC and C-V2X.

Figure 5:
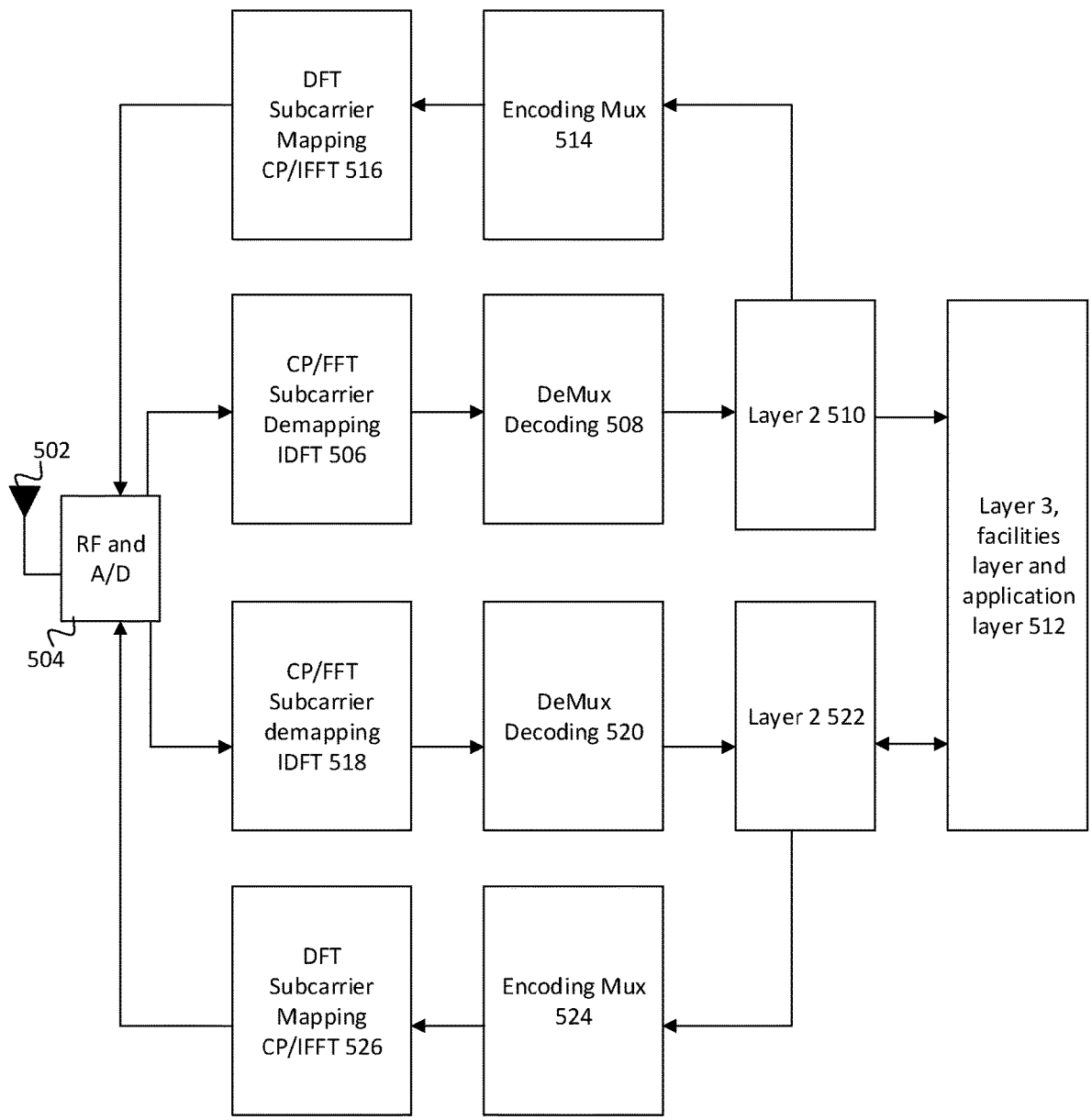
FIG. 5 depicts an alternative configuration of a dual-mode software-based RSU with layer 3 integration.

FIG. 5 depicts an alternative configuration in which the unit aggregates the C-V2X and DSRC technologies at layer 3. In this configuration, the C-V2X processes are depicted within units 516, 514, 506, and 508. Similarly, the DSRC processes are depicted in units 518, 520, 526, and 524. The one or more antennas 500 and to connect to the radiofrequency and analog/digital or digital/analog converter 504, which outputs C-V2X signals to the cyclic prefix/Fast Fourier Transform, subcarrier demapping, and inverse discrete Fourier transform unit 506, which outputs to the demultiplexing decoding unit 508, which outputs to one or more layer to processors 510, which output to the combined layer 3, facilities layer, and application layer 512. With respect to transmission signals, the layer 2 processors 510 may output C-V2X data to the encoding multiplexer unit 514, which may output to the discrete Fourier transform, subcarrier mapping, and cyclic prefix/inverse Fast Fourier Transform unit 516, which may output to the radiofrequency front end and digital/analog converter 504. With respect to DSRC signals, the radiofrequency front end and analog/digital converter 504 may output to the cyclic prefix/Fast Fourier Transform, subcarrier demapping, and inverse discrete Fourier transform unit 518, which may output to the demultiplexing and decoding unit 520, which may output to the DSRC layer to processors 522, which may output to the layer 3 facilities layer and application layer. For transmit signals, the layer 2 processors 522 may output to the encoding multiplex layer 524, which may output to the discrete Fourier transform, subcarrier mapping, cyclic prefix and inverse Fast Fourier Transform unit 526, which may output to the radiofrequency and digital/analog converter 504.

In this configuration as depicted in FIG. 5, the device implements the layer 1 and layer 2 functions for C-V2X and DSRC separately. In layer 3 and the facilities layer, the device utilizes one or more congestion control and/or admission control techniques to balance the loading.

It is expressly noted that FIGS. 2, 4, and 5 depict functional units to exemplify various configurations of software-based baseband processing. These functional units represent software-based processes rather than distinct hardware units. Although some of these functional units must be performed in a particular order, these functional units may be grouped as desired for a given implementation. Otherwise stated, provided that any necessary order for baseband signal processing is followed, the functional units for any given radio communication protocol may be grouped in one or more routines, one or more subroutines, one or more containers, or one or more subcontainers, as desired for the implementation.

According to one aspect, one or more of the baseband processes disclosed herein may be implemented on an open edge computing software platform, which may implement the baseband functions of the RSU or the OBU. In this manner, the IQ samples may arrive from the A/D convertor via an interface, such as, for example, the Enhanced Common Public Radio Interface (eCPRI). Based on the sampling rate, the time duration of the processing (for example, a single OFDM symbol processing, multiple symbol processing, Transmission Time Interval (TTI) level processing, etc), bandwidth, and the loading in the channel, the computing platform may launch any of plurality of containers or microservices on the edge platform. The orchestrator may ensure that a sequential order from the baseband processor is followed. In this manner, the computing platform sends the data packets between the plurality of containers. If a baseband process requires additional resources, the computing platform may offload any portion of the baseband process, such as to an accelerator or a general-purpose computing platform (GPP). On the GPP, various techniques including resource pinning, process prioritization, non-uniform memory access (NUMA) and kernel bypass (e.g. such as by using the Data plane Development Kit (DPDK)) techniques may reduce latency and guarantee the quality of service (QoS) and the throughput. If the cyclic redundancy check (CRC) of a physical layer packet (transport block) passes, the computing platform may pass the packet to layer 2. If the CRC fails, the orchestrator may counts it as a lost packet.

C-V2X systems extract timing synchronization from Global Positioning System (GPS) satellites. In this framework, the RSU may also implement the baseband processing of the GPS/Global Navigation Satellite System (GNSS) receivers in the software, such as my using one or more general-purpose processors.

According to an aspect of the disclosure, the first radio communication protocol of the RSU or the OBU may be a Vehicle to Everything (V2X) protocol according to Institute of Electrical and Electronics Engineers (IEEE) 802.11p 2019 or any subsequent generation thereof or any other wireless protocols. Similarly, the second radio communication protocol of the RSU or OBU may be a short-range communications protocol according to any of Dedicated Short-Range Communications (DSRC) protocol, European Committee for Standardization (CEN) standard EN 13372, CEN standard EN 12253, or European Telecommunications Standards Institute (ETSI) EN 302 663 v1.2.0 or any subsequent generation.

According to an aspect of the disclosure, the RSU may be configured as an RSU system, which may include a radiofrequency frontend; the roadside unit as disclosed herein; and a data link, configured to transmit data between the radiofrequency frontend and the roadside unit. This RSU system may further optionally include an antenna; and a cable, configured to connect the antenna to the radiofrequency frontend. The RSU system may further optionally include a cable compensator, configured to compensate for signal attenuation within the cable.

According to an aspect of the disclosure, the RSU may be optionally configured to receive high-layer data for transmission. In this manner, the RSU may include an input port, configured to receive first input signal and a second input signal from an application processing unit; and a processor, including a first processing subsystem, configured to execute a first baseband process of a first radio communication protocol on the first input signal and to generate a first output signal as an output of the first baseband process; a second processing subsystem, configured to execute a baseband process of a second radio communication protocol on the second input signal and to generate a second output signal as an output of the second baseband process; wherein the first processing subsystem is a first software containerization or a first machine virtualization of the processor, and wherein the second processing subsystem is a second software containerization or a second machine virtualization of the processor. This RSU may further include a radio frontend port, configured to send the first output signal to a radiofrequency frontend for wireless transmission according to a first radio communication protocol; and send the second output signal to the radiofrequency frontend for wireless transmission according to a second radio communication protocol.

The RSU may further include an output port, configured to output the first output signal and the second output signal to a processing unit. In this manner, the first baseband process may include subcarrier demapping, an inverse discrete Fourier transform, decoding, demodulation, or any of these, and the second baseband process may comprises subcarrier demapping, an inverse discrete Fourier transform, decoding, demodulation, or any of these.

Figure 6:
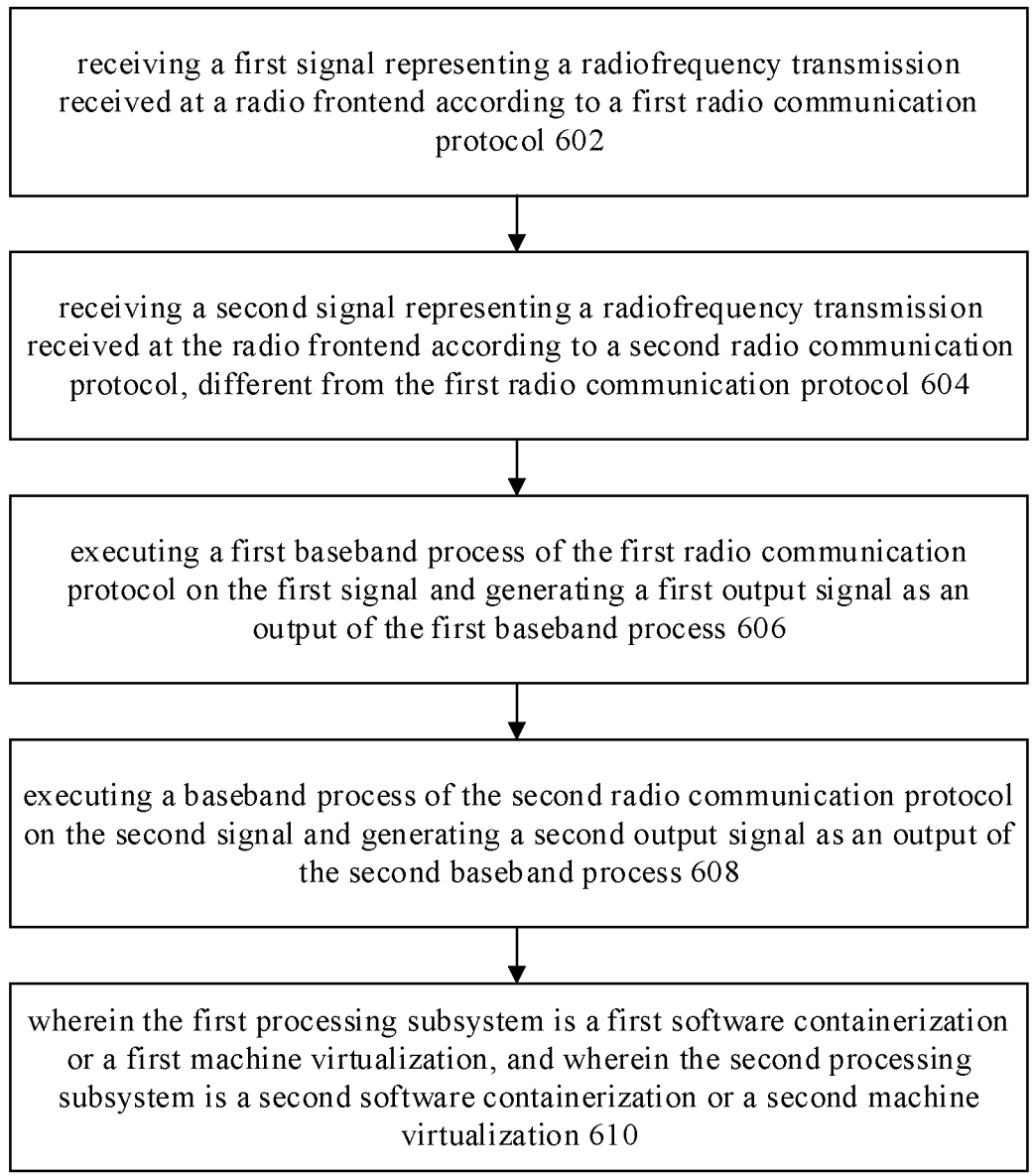
FIG. 6 depicts a method of data processing for a roadside unit, according to another aspect of the disclosure.

FIG. 6 depicts a method of data processing for a roadside unit, according to another aspect of the disclosure, the method including receiving a first signal representing a radiofrequency transmission received at a radio frontend according to a first radio communication protocol 602; receiving a second signal representing a radiofrequency transmission received at the radio frontend according to a second radio communication protocol, different from the first radio communication protocol 604; executing a first baseband process of the first radio communication protocol on the first signal and generating a first output signal as an output of the first baseband process 606; executing a baseband process of the second radio communication protocol on the second signal and generating a second output signal as an output of the second baseband process 608; wherein the first processing subsystem is a first software containerization or a first machine virtualization, and wherein the second processing subsystem is a second software containerization or a second machine virtualization 610.

The method may optionally be executed using an output port, configured to output the first output signal and the second output signal to a processing unit. In this method, the first baseband process and/or the second baseband process may include subcarrier demapping, an inverse discrete Fourier transform, decoding, demodulation, or any of these.

The RSU's implementation of aspects of baseband processing in a containerized or virtualized software-based module may permit reduced expense and ease of updates. According to an aspect of the disclosure, the RSU may be configured with a communication port, through which it can receive a software update for its software-based baseband processing system. According to another aspect of the disclosure, the RSU may be configured to connect to a trusted source to receive a software update, such as by downloading a software update for its software-based baseband processing system.

Additional aspects of the disclosure will now be described by way of example.

In Example 1, a roadside unit, including a radio frontend port, configured to receive a first signal representing a radiofrequency transmission received at a radio frontend according to a first radio communication protocol; and receive a second signal representing a radiofrequency transmission received at the radio frontend according to a second radio communication protocol, different from the first radio communication protocol; a processor, including: a first processing subsystem, configured to execute a first baseband process of the first radio communication protocol on the first signal and to generate a first output signal as an output of the first baseband process; a second processing subsystem, configured to execute a baseband process of the second radio communication protocol on the second signal and to generate a second output signal as an output of the second baseband process; wherein the first processing subsystem is a first software containerization or a first machine virtualization of the processor, and wherein the second processing subsystem is a second software containerization or a second machine virtualization of the processor.

In Example 2, the roadside unit of example 1, further including an output port, configured to output the first output signal and the second output signal to a processing unit.

In Example 3, the roadside unit of example 1 or 2, wherein the first baseband process includes subcarrier demapping, an inverse discrete Fourier transform, decoding, demodulation, or any of these.

In Example 4, the roadside unit of any one of examples 1 to 3, wherein the second baseband process includes subcarrier demapping, an inverse discrete Fourier transform, decoding, demodulation, or any of these.

In Example 5, the roadside unit of example 1 to 4, wherein the first processing subsystem is a first software containerization, and wherein the second processing subsystem is a second software containerization.

In Example 6, the roadside unit of example 5, further including a first plurality of software sub-containers within the first software containerization, and wherein each of the plurality of software sub-containers is dedicated to any of subcarrier demapping, an inverse discrete Fourier transform, decoding, or demodulation.

In Example 7, the roadside unit of example 5 or 6, further including a second plurality of software sub-containers within the second software containerization, and wherein each of the second plurality of software sub-containers is dedicated to any of subcarrier demapping, an inverse discrete Fourier transform, decoding, or demodulation.

In Example 8, the roadside unit of any one of examples 4 to 6, wherein the first processing subsystem is a first machine virtualization, and wherein the second processing subsystem is a second machine virtualization.

In Example 9, the roadside unit of example 8, further including a first plurality of software containers within the first machine virtualization, and wherein each of the plurality of software containers is dedicated to any of subcarrier demapping, an inverse discrete Fourier transform, decoding, or demodulation.

In Example 10, the roadside unit of example 8 to 9, further including a second plurality of software containers within the second machine virtualization, and wherein each of the second plurality of software sub-containers is dedicated to any of subcarrier demapping, an inverse discrete Fourier transform, decoding, or demodulation.

In Example 11, the roadside unit of any one of examples 5 to 10, further including a container orchestrator, configured to orchestrate the actions of any of the first plurality of software containers or the second plurality of software containers.

In Example 12, the roadside unit of any one of examples 1 to 11, wherein the first radio communication protocol is a Vehicle to Everything (V2X) protocol according to Institute of Electrical and Electronics Engineers (IEEE) 802.11p 2019 or any subsequent generation thereof or any other wireless protocols.

In Example 13, the roadside unit of any one of examples 1 to 12, wherein the second radio communication protocol is short-range communications protocol according to any of Dedicated Short-Range Communications (DSRC) protocol, European Committee for Standardization (CEN) standard EN 13372, CEN standard EN 12253, or European Telecommunications Standards Institute (ETSI) EN 302 663 v1.2.0 or any subsequent generation.

In Example 14, a roadside unit system, including: a radiofrequency frontend; the roadside unit of any one of examples 1 to 13; a data link, configured to transmit data between the radiofrequency frontend and the roadside unit.

In Example 15, the roadside unit system of example 14, further including an antenna; and a cable, configured to connect the antenna to the radiofrequency frontend.

In Example 16, the roadside unit system of example 15, further including a cable compensator, configured to compensate for signal attenuation within the cable.

In Example 17, a roadside unit, including: an input port, configured to receive first input signal and a second input signal from an application processing unit; and a processor, including a first processing subsystem, configured to execute a first baseband process of a first radio communication protocol on the first input signal and to generate a first output signal as an output of the first baseband process; a second processing subsystem, configured to execute a baseband process of a second radio communication protocol on the second input signal and to generate a second output signal as an output of the second baseband process; wherein the first processing subsystem is a first software containerization or a first machine virtualization of the processor, and wherein the second processing subsystem is a second software containerization or a second machine virtualization of the processor.

In Example 18, the roadside unit of example 17, further including a radio frontend port, configured to send the first output signal to a radiofrequency frontend for wireless transmission according to a first radio communication protocol; and send the second output signal to the radiofrequency frontend for wireless transmission according to a second radio communication protocol.

In Example 19, the roadside unit of example 17 or 18, further including an output port, configured to output the first output signal and the second output signal to a processing unit.

In Example 20, the roadside unit of example 17 to 19, wherein the first baseband process includes subcarrier demapping, an inverse discrete Fourier transform, decoding, demodulation, or any of these.

In Example 21, the roadside unit of any one of examples 17 to 20, wherein the second baseband process includes subcarrier demapping, an inverse discrete Fourier transform, decoding, demodulation, or any of these.

In Example 22, the roadside unit of example 17 to 21, wherein the first processing subsystem is a first software containerization, and wherein the second processing subsystem is a second software containerization.

In Example 23, the roadside unit of example 22, further including a first plurality of software sub-containers within the first software containerization, and wherein each of the plurality of software sub-containers is dedicated to any of subcarrier demapping, an inverse discrete Fourier transform, decoding, or demodulation.

In Example 24, the roadside unit of example 22 or 23, further including a second plurality of software sub-containers within the second software containerization, and wherein each of the second plurality of software sub-containers is dedicated to any of subcarrier demapping, an inverse discrete Fourier transform, decoding, or demodulation.

In Example 25, the roadside unit of any one of examples 21 or 23, wherein the first processing subsystem is a first machine virtualization, and wherein the second processing subsystem is a second machine virtualization.

In Example 26, the roadside unit of example 25, further including a first plurality of software containers within the first machine virtualization, and wherein each of the plurality of software containers is dedicated to any of subcarrier demapping, an inverse discrete Fourier transform, decoding, or demodulation.

In Example 27, the roadside unit of example 25 or 26, further including a second plurality of software containers within the second machine virtualization, and wherein each of the second plurality of software sub-containers is dedicated to any of subcarrier demapping, an inverse discrete Fourier transform, decoding, or demodulation.

In Example 28, the roadside unit of any one of examples 22 to 27, further including a container orchestrator, configured to orchestrate the actions of any of the first plurality of software containers or the second plurality of software containers.

In Example 29, the roadside unit of any one of examples 17 to 28, wherein the first radio communication protocol is a Vehicle to Everything (V2X) protocol according to Institute of Electrical and Electronics Engineers (IEEE) 802.11p 2019 or any subsequent generation thereof or any other wireless protocols.

In Example 30, the roadside unit of any one of examples 17 to 29, wherein the second radio communication protocol is short-range communications protocol according to any of Dedicated Short-Range Communications (DSRC) protocol, European Committee for Standardization (CEN) standard EN 13372, CEN standard EN 12253, or European Telecommunications Standards Institute (ETSI) EN 302 663 v1.2.0 or any subsequent generation.

In Example 31, a roadside unit system, including a radiofrequency frontend; the roadside unit of any one of examples 17 to 30; a data link, configured to transmit data between the radiofrequency frontend and the roadside unit.

In Example 32, the roadside unit system of example 31, further including:
an antenna; and a cable, configured to connect the antenna to the radiofrequency frontend.

In Example 33, the roadside unit system of example 32, further including a cable compensator, configured to compensate for signal attenuation within the cable.

In Example 34, a vehicle, including a roadside unit communicator, including a radio frontend port, configured to receive a first signal representing a radiofrequency transmission received at a radio frontend according to a first radio communication protocol; and receive a second signal representing a radiofrequency transmission received at the radio frontend according to a second radio communication protocol, different from the first radio communication protocol; a processor, including a first processing subsystem, configured to execute a first baseband process of the first radio communication protocol on the first signal and to generate a first output signal as an output of the first baseband process; a second processing subsystem, configured to execute a baseband process of the second radio communication protocol on the second signal and to generate a second output signal as an output of the second baseband process; wherein the first processing subsystem is a first software containerization or a first machine virtualization of the processor, and wherein the second processing subsystem is a second software containerization or a second machine virtualization of the processor.

In Example 35, the vehicle of example 34, further including an output port, configured to output the first output signal and the second output signal to a processing unit.

In Example 36, the vehicle of example 34 or 35, wherein the first baseband process includes subcarrier demapping, an inverse discrete Fourier transform, decoding, demodulation, or any of these.

In Example 37, the vehicle of any one of examples 34 to 36, wherein the second baseband process includes subcarrier demapping, an inverse discrete Fourier transform, decoding, demodulation, or any of these.

In Example 38, the vehicle of example 34 to 37, wherein the first processing subsystem is a first software containerization, and wherein the second processing subsystem is a second software containerization.

In Example 39, the vehicle of example 38, further including a first plurality of software sub-containers within the first software containerization, and wherein each of the plurality of software sub-containers is dedicated to any of subcarrier demapping, an inverse discrete Fourier transform, decoding, or demodulation.

In Example 40, the vehicle of example 38 or 39, further including a second plurality of software sub-containers within the second software containerization, and wherein each of the second plurality of software sub-containers is dedicated to any of subcarrier demapping, an inverse discrete Fourier transform, decoding, or demodulation.

In Example 41, the vehicle of any one of examples 37 to 39, wherein the first processing subsystem is a first machine virtualization, and wherein the second processing subsystem is a second machine virtualization.

In Example 42, the vehicle of example 41, further including a first plurality of software containers within the first machine virtualization, and wherein each of the plurality of software containers is dedicated to any of subcarrier demapping, an inverse discrete Fourier transform, decoding, or demodulation.

In Example 43, the vehicle of example 41 or 42, further including a second plurality of software containers within the second machine virtualization, and wherein each of the second plurality of software sub-containers is dedicated to any of subcarrier demapping, an inverse discrete Fourier transform, decoding, or demodulation.

In Example 44, the vehicle of any one of examples 38 to 43, further including a container orchestrator, configured to orchestrate the actions of any of the first plurality of software containers or the second plurality of software containers.

In Example 45, the vehicle of any one of examples 34 or 44, wherein the first radio communication protocol is a Vehicle to Everything (V2X) protocol according to Institute of Electrical and Electronics Engineers (IEEE) 802.11p 2019 or any subsequent generation thereof or any other wireless protocols.

In Example 46, the vehicle of any one of examples 34 to 45, wherein the second radio communication protocol is short-range communications protocol according to any of Dedicated Short-Range Communications (DSRC) protocol, European Committee for Standardization (CEN) standard EN 13372, CEN standard EN 12253, or European Telecommunications Standards Institute (ETSI) EN 302 663 v1.2.0 or any subsequent generation.

In Example 47, a vehicle, including a roadside unit communicator system, including a radiofrequency frontend; the roadside unit communicator of any one of examples 34 to 46; a data link, configured to transmit data between the radiofrequency frontend and the roadside unit communicator.

In Example 48, the roadside unit communicator system of example 47, further including: an antenna; and a cable, configured to connect the antenna to the radiofrequency frontend.

In Example 49, the roadside unit communicator system of example 48, further including a cable compensator, configured to compensate for signal attenuation within the cable.

In Example 50, a vehicle including a roadside unit communicator, including: an input port, configured to receive first input signal and a second input signal from an application processing unit; and a processor, including: a first processing subsystem, configured to execute a first baseband process of a first radio communication protocol on the first input signal and to generate a first output signal as an output of the first baseband process; a second processing subsystem, configured to execute a baseband process of a second radio communication protocol on the second input signal and to generate a second output signal as an output of the second baseband process; wherein the first processing subsystem is a first software containerization or a first machine virtualization of the processor, and wherein the second processing subsystem is a second software containerization or a second machine virtualization of the processor.

In Example 51, the vehicle of example 50, further including a radio frontend port, configured to: send the first output signal to a radiofrequency frontend for wireless transmission according to a first radio communication protocol; and send the second output signal to the radiofrequency frontend for wireless transmission according to a second radio communication protocol.

In Example 52, the vehicle of example 50 or 51, further including an output port, configured to output the first output signal and the second output signal to a processing unit.

In Example 53, the vehicle of example 50 to 52, wherein the first baseband process includes subcarrier demapping, an inverse discrete Fourier transform, decoding, demodulation, or any of these.

In Example 54, the vehicle of any one of examples 50 to 53, wherein the second baseband process includes subcarrier demapping, an inverse discrete Fourier transform, decoding, demodulation, or any of these.

In Example 55, the vehicle of example 50 to 54, wherein the first processing subsystem is a first software containerization, and wherein the second processing subsystem is a second software containerization.

In Example 56, the vehicle of example 55, further including a first plurality of software sub-containers within the first software containerization, and wherein each of the plurality of software sub-containers is dedicated to any of subcarrier demapping, an inverse discrete Fourier transform, decoding, or demodulation.

In Example 57, the vehicle of example 55 or 56, further including a second plurality of software sub-containers within the second software containerization, and wherein each of the second plurality of software sub-containers is dedicated to any of subcarrier demapping, an inverse discrete Fourier transform, decoding, or demodulation.

In Example 58, the vehicle of any one of examples 54 to 56, wherein the first processing subsystem is a first machine virtualization, and wherein the second processing subsystem is a second machine virtualization.

In Example 59, the vehicle of example 58, further including a first plurality of software containers within the first machine virtualization, and wherein each of the plurality of software containers is dedicated to any of subcarrier demapping, an inverse discrete Fourier transform, decoding, or demodulation.

In Example 60, the vehicle of example 58 or 59, further including a second plurality of software containers within the second machine virtualization, and wherein each of the second plurality of software sub-containers is dedicated to any of subcarrier demapping, an inverse discrete Fourier transform, decoding, or demodulation.

In Example 61, the vehicle of any one of examples 55 to 60, further including a container orchestrator, configured to orchestrate the actions of any of the first plurality of software containers or the second plurality of software containers.

In Example 62, the vehicle of any one of examples 50 to 61, wherein the first radio communication protocol is a Vehicle to Everything (V2X) protocol according to Institute of Electrical and Electronics Engineers (IEEE) 802.11p 2019 or any subsequent generation thereof or any other wireless protocols.

In Example 63, the vehicle of any one of examples 50 to 62, wherein the second radio communication protocol is short-range communications protocol according to any of Dedicated Short-Range Communications (DSRC) protocol, European Committee for Standardization (CEN) standard EN 13372, CEN standard EN 12253, or European Telecommunications Standards Institute (ETSI) EN 302 663 v1.2.0 or any subsequent generation.

In Example 64, a vehicle including a roadside unit communicator system, including: a radiofrequency frontend; the roadside unit communicator of any one of examples 50 to 63; a data link, configured to transmit data between the radiofrequency frontend and the roadside unit communicator.

In Example 65, the roadside unit system of example 64, further including: an antenna; and a cable, configured to connect the antenna to the radiofrequency frontend.

In Example 66, the roadside unit system of example 65, further including a cable compensator, configured to compensate for signal attenuation within the cable.

In Example 66, a roadside unit, including a radio means, for receiving a first signal representing a radiofrequency transmission received at a radio frontend according to a first radio communication protocol; and receiving a second signal representing a radiofrequency transmission received at the radio frontend according to a second radio communication protocol, different from the first radio communication protocol; a processing means, including: a first processing subsystem means for executing a first baseband process of the first radio communication protocol on the first signal and to generate a first output signal as an output of the first baseband process; a second processing subsystem means for executing a baseband process of the second radio communication protocol on the second signal and to generate a second output signal as an output of the second baseband process; wherein the first processing subsystem means is a first software containerization or a first machine virtualization of the processor, and wherein the second processing subsystem means is a second software containerization or a second machine virtualization of the processor.

In Example 67, the roadside unit of Example 66, further including an outputting means for outputting the first output signal and the second output signal to a processing unit.

In Example 68, the roadside unit of Example 66 or 67, wherein the first baseband process includes subcarrier demapping, an inverse discrete Fourier transform, decoding, demodulation, or any of these.

In Example 69, the roadside unit of any one of Examples 66 to 68, wherein the second baseband process includes subcarrier demapping, an inverse discrete Fourier transform, decoding, demodulation, or any of these.

In Example 70, the roadside unit of Example 66 to 69, wherein the first processing subsystem is a first software containerization, and wherein the second processing subsystem is a second software containerization.

In Example 71, the roadside unit of Example 70, further including a first plurality of software sub-containers processing means within the first software containerization, and wherein each of the plurality of software sub-container processing means is dedicated to any of subcarrier demapping, an inverse discrete Fourier transform, decoding, or demodulation.

In Example 72, the roadside unit of Example 70 or 71, further including a second plurality of software sub-container processing means within the second software containerization, and wherein each of the second plurality of software sub-container means is dedicated to any of subcarrier demapping, an inverse discrete Fourier transform, decoding, or demodulation.

In Example 73, the roadside unit of any one of Examples 70 to 72, wherein the first processing subsystem is a first machine virtualization, and wherein the second processing subsystem is a second machine virtualization.

In Example 74, the roadside unit of Example 73, further including a first plurality of software container processing means within the first machine virtualization, and wherein each of the plurality of software containers is dedicated to any of subcarrier demapping, an inverse discrete Fourier transform, decoding, or demodulation.

In Example 75, the roadside unit of Example 73 or 74, further including a second plurality of software container processing means within the second machine virtualization, and wherein each of the second plurality of software sub-container processing means is dedicated to any of subcarrier demapping, an inverse discrete Fourier transform, decoding, or demodulation.

In Example 76, the roadside unit of any one of Examples 66 to 75, further including a container orchestrating means for orchestrating the actions of any of the first plurality of software containers or the second plurality of software containers.

In Example 77, the roadside unit of any one of Examples 66 to 76, wherein the first radio communication protocol is a Vehicle to Everything (V2X) protocol according to Institute of Electrical and Electronics Engineers (IEEE) 802.11p 2019 or any subsequent generation thereof or any other wireless protocols.

In Example 78, the roadside unit of any one of Examples 66 to 77, wherein the second radio communication protocol is short-range communications protocol according to any of Dedicated Short-Range Communications (DSRC) protocol, European Committee for Standardization (CEN) standard EN 13372, CEN standard EN 12253, or European Telecommunications Standards Institute (ETSI) EN 302 663 v1.2.0 or any subsequent generation.

While the above descriptions and connected figures may depict components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The invention claimed is:

1. A roadside unit comprising:
    a radio frontend port configured to:
        receive a first signal representing a radiofrequency transmission received at a radio frontend according to a first radio communication protocol; and
        receive a second signal representing a radiofrequency transmission received at the radio frontend according to a second radio communication protocol, different from the first radio communication protocol; and
    a processor comprising:
        a first processing subsystem configured to execute a first baseband process of the first radio communication protocol on the first signal and to generate a first output signal as an output of the first baseband process, wherein the processor is configured to instantiate the first baseband process in the first processing subsystem based on at least one of a sampling rate, symbol duration, bandwidth, or channel loading of the first signal; and
        a second processing subsystem configured to execute a second baseband process of the second radio communication protocol on the second signal and to generate a second output signal as an output of the second baseband process, wherein the processor is configured to instantiate the second baseband process in the second processing subsystem based on at least one of a sampling rate, symbol duration, bandwidth, or channel loading of the second signal,
        wherein the first processing subsystem is a first software containerization or a first machine virtualization of the processor, wherein the second processing subsystem is a second software containerization or a second machine virtualization of the processor.

2. The roadside unit of claim 1, the roadside unit further comprising an output port configured to output the first output signal and the second output signal to a processing unit.

3. The roadside unit of claim 1, wherein the first baseband process and the second baseband process each comprise any of subcarrier demapping, inverse discrete Fourier transforming, decoding, and demodulation.

4. The roadside unit of claim 1, wherein the first processing subsystem comprises a first software containerization, wherein the second processing subsystem comprises a second software containerization.

5. The roadside unit of claim 4, the roadside unit further comprising a first plurality of software sub-containers within the first software containerization and a second plurality of software sub-containers within the second software containerization, wherein each of the first plurality of software sub-containers and each of the second plurality of software sub-containers is dedicated to any of subcarrier demapping, inverse discrete Fourier transforming, decoding, or demodulation.

6. The roadside unit of claim 5, the roadside unit further comprising a container orchestrator configured to orchestrate actions of any of the first plurality of software sub-containers or the second plurality of software sub-containers.

7. The roadside unit of claim 1, wherein the first processing subsystem is a first machine virtualization, wherein the second processing subsystem is a second machine virtualization.

8. The roadside unit of claim 7, the roadside unit further comprising a first plurality of software sub-containers within the first machine virtualization, wherein each of the first plurality of software sub-containers is dedicated to any of subcarrier demapping, an inverse discrete Fourier transform, decoding, or demodulation and/or further comprising a second plurality of software sub-containers within the second machine virtualization, wherein each of the second plurality of software sub-containers is dedicated to any of subcarrier demapping, an inverse discrete Fourier transform, decoding, or demodulation.

9. The roadside unit of claim 1, wherein the first radio communication protocol is a Vehicle to Everything (V2X) protocol according to Institute of Electrical and Electronics Engineers (IEEE) 802.11p 2019 or any subsequent generation thereof.

10. The roadside unit of claim 1, wherein the second radio communication protocol is a short-range communications protocol according to any of Dedicated Short-Range Communications (DSRC) protocol, European Committee for Standardization (CEN) standard EN 13372, CEN standard EN 12253, or European Telecommunications Standards Institute (ETSI) EN 302 663.

11. A roadside unit system comprising:
a radiofrequency frontend;
a roadside unit comprising:
  a radio frontend port configured to:
    receive a first signal representing a radiofrequency transmission received at a radio frontend according to a first radio communication protocol; and
    receive a second signal representing a radiofrequency transmission received at the radio frontend according to a second radio communication protocol, different from the first radio communication protocol; and
  a processor comprising:
    a first processing subsystem configured to execute a first baseband process of the first radio communication protocol on the first signal and to generate a first output signal as an output of the first baseband process, wherein the processor is configured to instantiate the first baseband process in the first processing subsystem based on at least one of a sampling rate, symbol duration, bandwidth, or channel loading of the first signal; and
    a second processing subsystem configured to execute a second baseband process of the second radio communication protocol on the second signal and to generate a second output signal as an output of the second baseband process, wherein the processor is configured to instantiate the second baseband process in the second processing subsystem based on at least one of a sampling rate, symbol duration, bandwidth, or channel loading of the second signal, wherein the first processing subsystem is a first software containerization or a first machine virtualization of the processor, wherein the second processing subsystem is a second software containerization or a second machine virtualization of the processor; and
  a data link configured to transmit data between the radiofrequency frontend and the roadside unit.

12. The roadside unit system of claim 11, wherein the radiofrequency frontend comprises:
an antenna port configured to receive an analog signal representing a signal received on one or more antennas; and
an analog-to-digital converter configured to convert the analog signal to a digital signal, and to output the digital signal to the radio frontend port.

13. The roadside unit system of claim 12, the roadside unit system further comprising:
an antenna electrically conductively connected to the antenna port; and
a cable compensator electrically conductively connected between the antenna and the radiofrequency frontend, wherein the cable compensator is configured to compensate for signal attenuation between the antenna and the radiofrequency frontend.

14. The roadside unit system of claim 11, wherein the first processing subsystem comprises a first software containerization, wherein the second processing subsystem comprises a second software containerization.

15. The roadside unit of claim 14, the roadside unit further comprising a first plurality of software sub-containers within the first software containerization and a second plurality of software sub-containers within the second software containerization, wherein each of the first plurality of software sub-containers and each of the second plurality of software sub-containers is dedicated to any of subcarrier demapping, inverse discrete Fourier transforming, decoding, or demodulation.

16. The roadside unit of claim 15, the roadside unit further comprising a container orchestrator configured to orchestrate actions of any of the first plurality of software sub-containers or the second plurality of software sub-containers.

17. A method of data processing for a roadside unit, the method comprising:
receiving a first signal representing a radiofrequency transmission received at a radio frontend according to a first radio communication protocol;
receiving a second signal representing a radiofrequency transmission received at the radio frontend according to a second radio communication protocol, different from the first radio communication protocol;
executing, in a first processing subsystem, a first baseband process of the first radio communication protocol on the first signal and generating a first output signal as an output of the first baseband process, wherein the executing the first baseband process comprises instantiating the first baseband process in the first processing subsystem based on at least one of a sampling rate, symbol duration, bandwidth, or channel loading of the first signal; and
executing, in a second processing subsystem, a second baseband process of the second radio communication protocol on the second signal and generating a second output signal as an output of the second baseband process, wherein the executing the second baseband process comprises instantiating the second baseband process in the second processing subsystem based on at least one of a sampling rate, symbol duration, bandwidth, or channel loading of the second signal, wherein the first processing subsystem is a first software containerization or a first machine virtualization, wherein the second processing subsystem is a second software containerization or a second machine virtualization.

18. The method of claim 17, wherein the first baseband process or the second baseband process comprises subcarrier demapping, inverse discrete Fourier transforming, decoding, demodulation comprises subcarrier demapping.

19. The method of claim 17, the method further comprising dedicating any of subcarrier demapping, inverse discrete Fourier transforming, decoding, demodulation comprises subcarrier demapping to the first baseband process or the second baseband process.

20. The method of claim 17, wherein the first radio communication protocol is a Vehicle to Everything (V2X) protocol according to Institute of Electrical and Electronics Engineers (IEEE) 802.11p 2019 or any subsequent generation thereof, wherein the second radio communication protocol is short-range communications protocol according to any of Dedicated Short-Range Communications (DSRC) protocol, European Committee for Standardization (CEN) standard EN 13372, CEN standard EN 12253, or European Telecommunications Standards Institute (ETSI) EN 302 663.

* * * * *